Sept. 6, 1955  R. B. MATTHEWS  2,717,381
THERMOELECTRICALLY POWERED CONTROL DEVICE
FOR WATER HEATERS AND THE LIKE
Filed Sept. 13, 1951  6 Sheets-Sheet 1

INVENTOR.
Russell B. Matthews
BY
Brown, Jackson, Boettcher & Dienner
Attys.

Sept. 6, 1955  R. B. MATTHEWS  2,717,381
THERMOELECTRICALLY POWERED CONTROL DEVICE
FOR WATER HEATERS AND THE LIKE
Filed Sept. 13, 1951  6 Sheets-Sheet 2

INVENTOR.
Russell B. Matthews
BY
Brown, Jackson, Boettcher & Dienner
Attys.

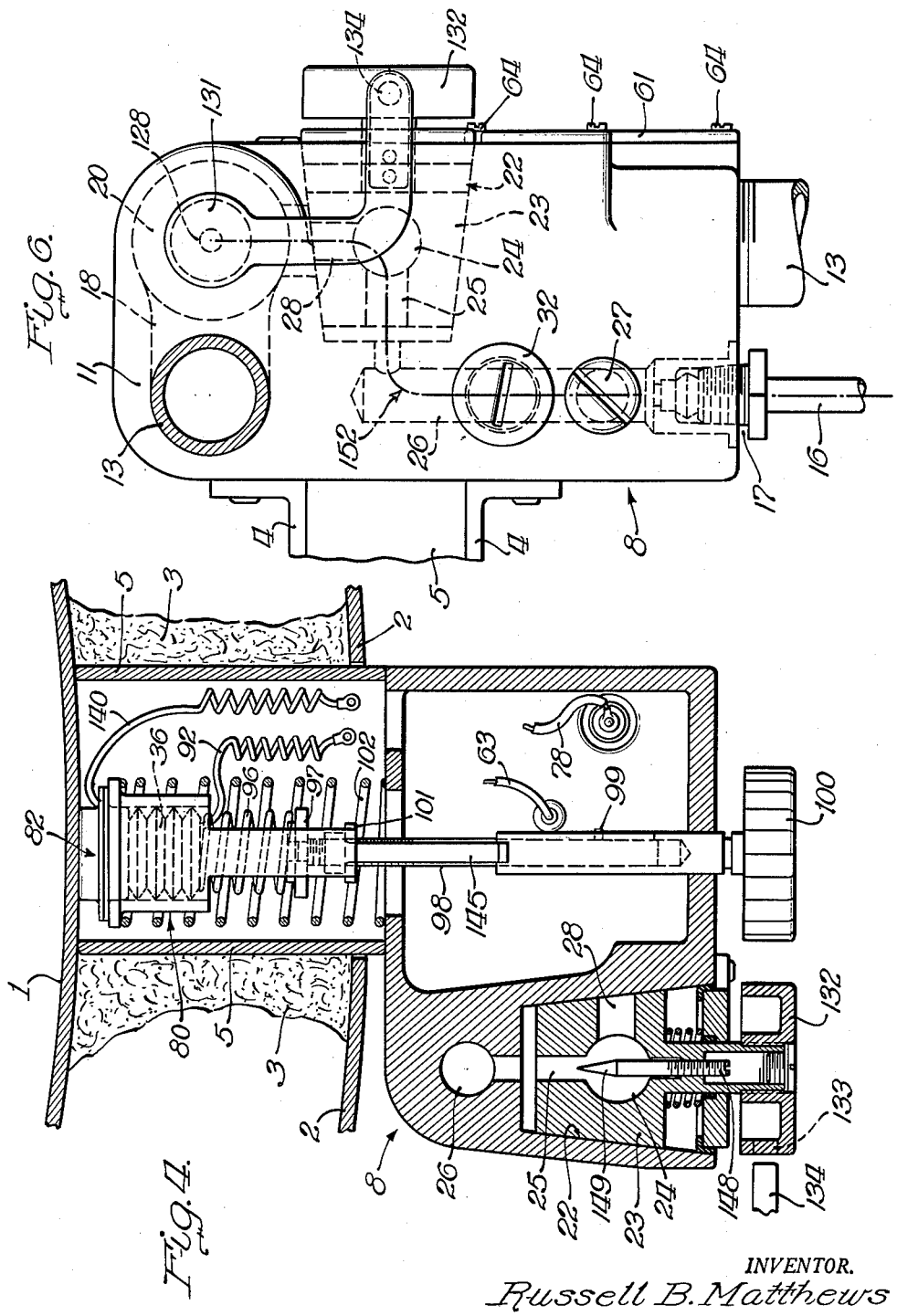

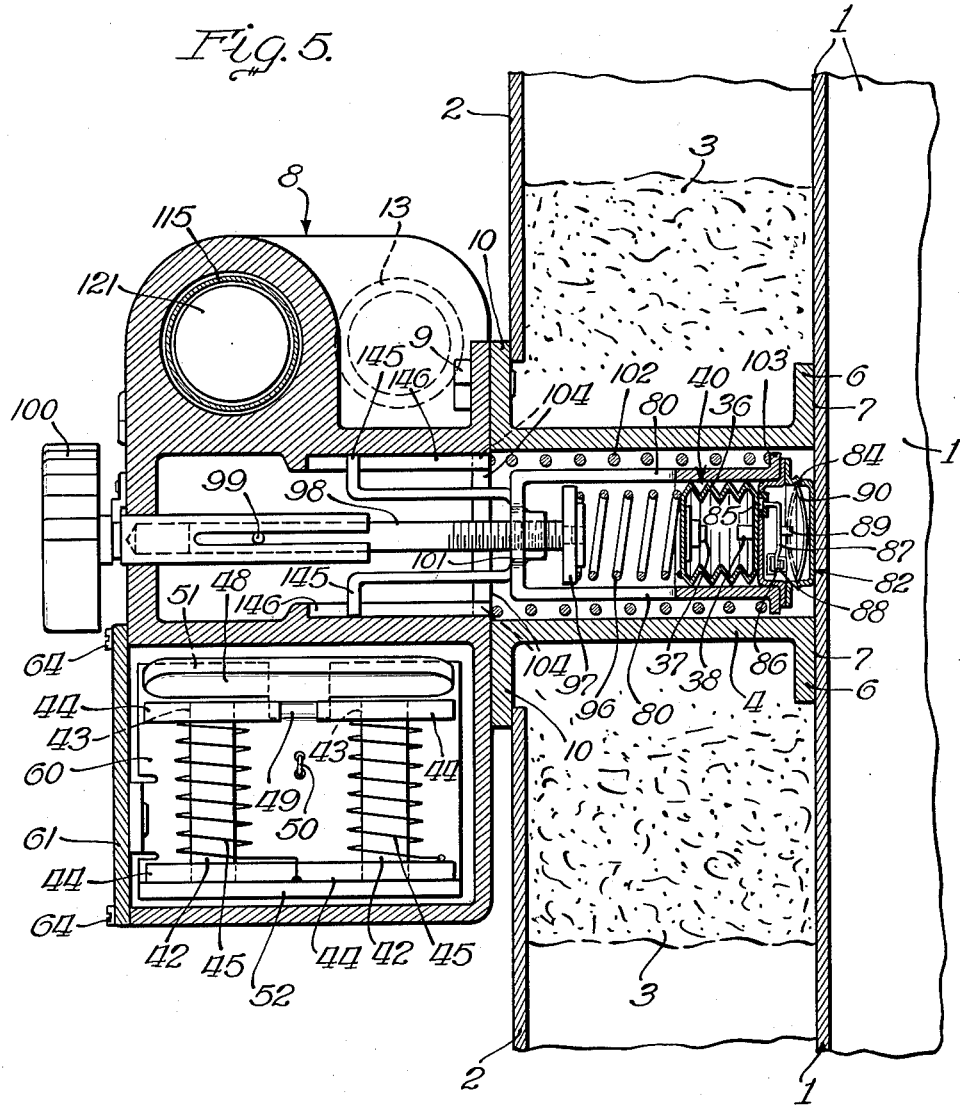

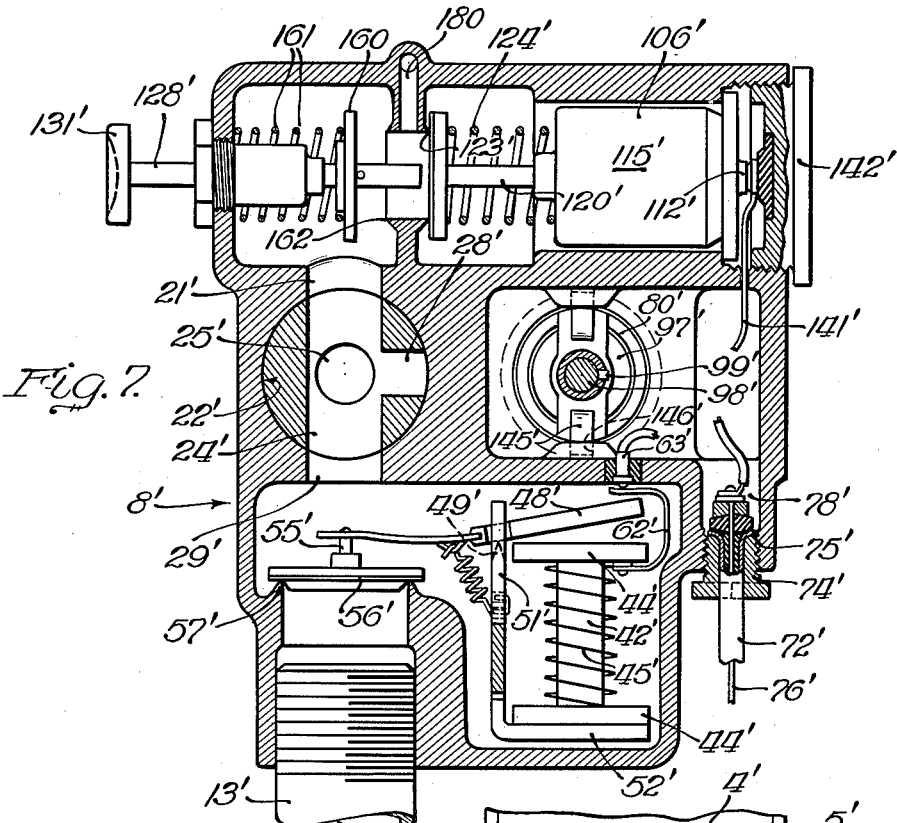
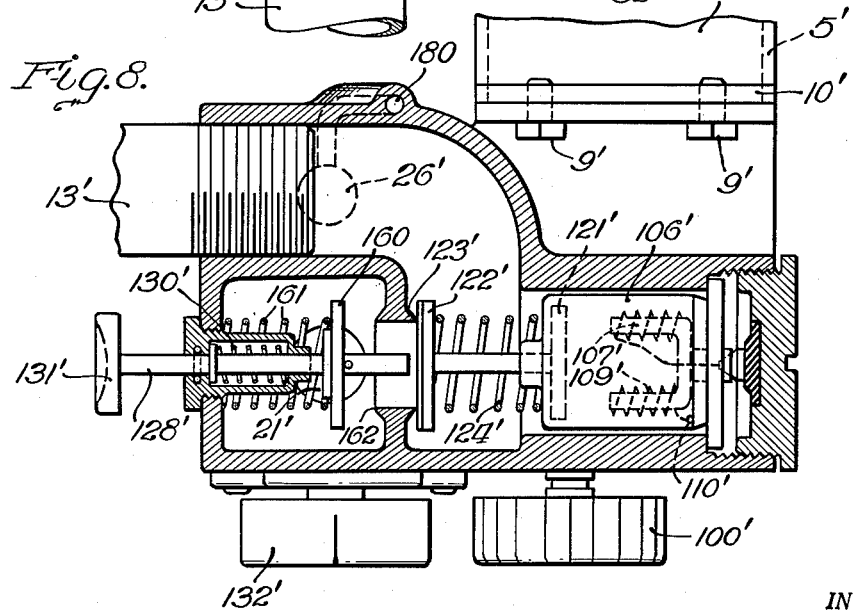

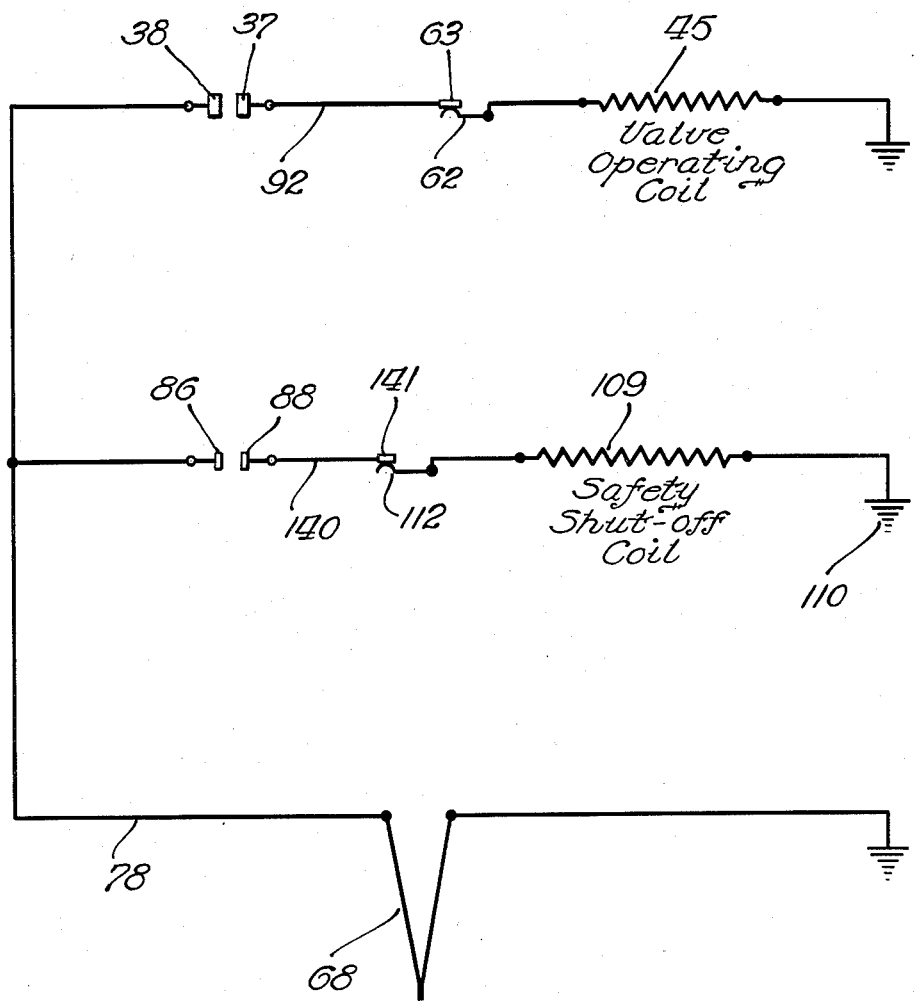

United States Patent Office 2,717,381
Patented Sept. 6, 1955

2,717,381

THERMOELECTRICALLY POWERED CONTROL DEVICE FOR WATER HEATERS AND THE LIKE

Russell B. Matthews, Wauwatosa, Wis., assignor to Milwaukee Gas Specialty Company, Milwaukee, Wis., a corporation of Wisconsin Application September 13, 1951, Serial No. 246,464

15 Claims. (Cl. 236—21)

This invention relates, in general, to heater control devices and has particular relation to a thermoelectrically powered control device for water heaters and the like.

In prior water heater controls, rod and tube type thermostats have commonly been employed for controlling a valve arranged to control the fuel supply for the main burner. These rod and tube thermostats require an opening in the wall of the tank of the heater through which the thermostat may be inserted into the tank. This subjects the tanks to leaks, and complicates installation and service. Moreover, in order to obtain a small operating differential with present rod and tube type thermostats, it is necessary to have a rod and tube of a length of the order of about eight inches to nine inches. Tanks having a center flue do not have sufficient space available for insertion of such a rod and tube type thermostat.

Bulb type thermostats have also been proposed for water heaters and the like, but these require a capillary tube leading from the bulb in proximity to the valve and linkage mechanism or the like for causing operation of the valve by expansion and contraction of the fluid within the bulb.

One of the main objects of the present invention is to provide an improved thermoelectrically powered and electromagnetically operated control device that may be readily installed without breaking through or providing an opening in the wall of the tank of the heater. This eliminates the possibility of leaks, and simplifies installation and service.

Another object of the invention is to provide a thermoelectrically powered and electromagnetically operated control device having thermally responsive means adapted to be held in heat conductive relation to an outer surface of an imperforate portion of the wall of the heater by the attachment of the control device to the heater.

Another object of the invention is to provide a thermoelectrically powered control device having a thermostat in the form of a thermally sensitive switch adapted to be held in heat receiving relation to an imperforate portion of the wall of the heater by the attachment of the control device to the heater, and a thermoelectrically powered electromagnetic valve operator for actuating a fuel control valve in response to the temperature to which the switch is subjected.

Another object of the invention is to provide an improved combination control device including a thermally sensitive switch of the character set forth, a thermoelectrically powered electromagnetic valve operator for actuating the valve in response to the temperature to which the switch is subjected, a manually operable gas cock, and, if desired, a thermoelectric safety shut-off which will assure 100% shut-off of the fuel for both the main burner and a pilot burner therefor upon extinguishment of the pilot burner. If and where desired, the thermoelectric safety shut-off may be omitted, leaving an inexpensive automatic thermoselectrically powered device that will turn on the gaseous fuel supply for the main burner only when the pilot burner is ignited.

Another object of the invention is to provide in a control device of the class described, a thermostat having a high inherent sensitivity, and means—particularly a high limit switch—arranged to prevent too rapid burner cycling.

Another object of the invention is to provide in a control device of the class described, a thermostat having a high limit switch arranged to be positioned, when the control device is attached to the heater, between the thermostat and an imperforate portion of the wall of the heater and in contact or heat conductive relation with respect to such imperforate wall portion.

Another object of the invention is to provide for a control device of the class described, an adapter or mounting bracket having a dimension related to the thickness of the wall of the heater and adapted to be interposed between an imperforate portion of said wall and the body of the control device, the bracket being interchangeable with other brackets having different dimensions related to other wall thicknesses, whereby to provide adjustment or variation for different thicknesses of water tank insulation.

Another object of the invention is to provide a control device in which the thermally responsive unit and the thermoelectrically powered electromagnetic operator are readily removable for repair, and adapted to be readily installed and replaced without making or breaking a water seal.

Further objects and advantages, and numerous modifications and adaptations of the invention will appear from the following detailed description, taken in connection with the accompanying drawings.

In the drawings:

Figure 4 is a horizontal sectional view taken substantially along the line 4—4 of Figure 2;

Figure 5 is a vertical sectional view taken substantially along the line 5—5 of Figure 2;

Figure 6 is an end view of the left-hand end of the device as it is shown in Figure 1;

Figure 7 is a vertical sectional view similar to Figure 2, but showing a modified form of device embodying the present invention;

Figure 8 is a horizontal sectional view similar to Figure 3 through the modified form of device shown in Figure 7; and Figure 9 is an illustrative circuit diagram for the control device selected for illustration.

Figure 1:
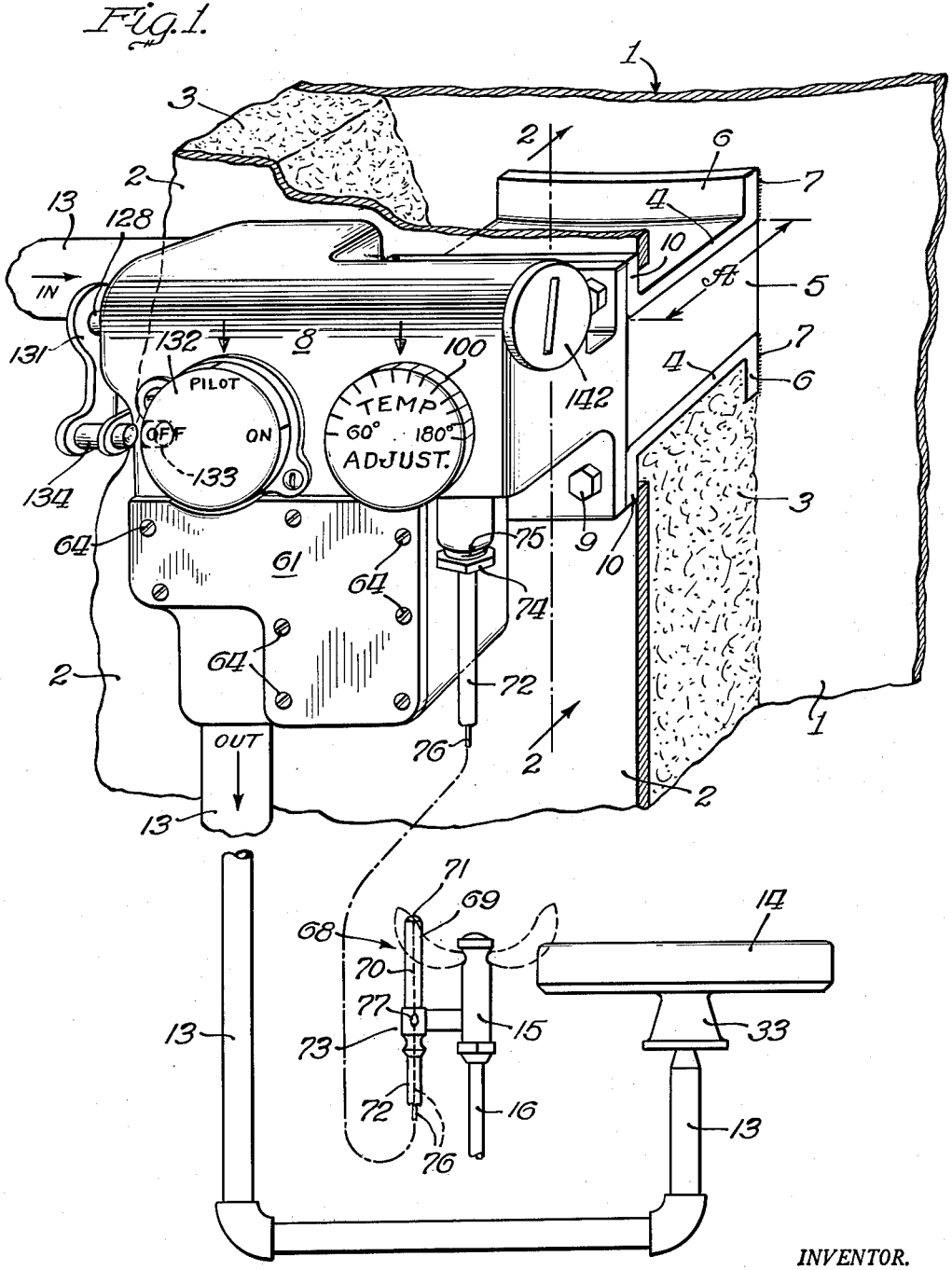
Figure 1 is a perspective view of a control device embodying the present invention as attached to an imperforate portion of the wall of a water heater which is shown fragmentarily.

Referring now to the drawings, there is shown fragmentarily and more or less schematically in Figures 1 and 5 a wall of a water heater structure. This wall may, for example, comprise an inner metallic wall or shell 1, and an outer metallic wall or shell 2 spaced therefrom, with suitable insulation 3 filling the space between these walls, as well understood in the art.

An adapter or mounting bracket is shown as comprising a pair of vertically spaced bracket members 4, with the space between these members closed at opposite ends by plates 5 attached, for example, by welding to the ends of the members 4. Mounting brackets of tubular or other form are contemplated within the scope of the present invention. The inner ends of the bracket members 4 have flanges 6 which, when the control device is applied to the heater, are welded, bolted, or otherwise attached at 7 to the outer surface of an imperforate portion of the wall 1 without breaking through the wall 1. The surfaces of the flanges 6 which seat against the wall 1 are preferably curved to conform to the curved contour of the wall 1 which is commonly of cylindrical form.

The main control body 8 may be in the form of a casting and of the same size for all tanks, or at least tanks of different sizes or with different wall thicknesses. The control body 8 is attached, for example, by bolts 9 to flanges 10 at the outer ends of the bracket members 4. The mounting bracket has a dimension A related as shown in the drawings to the thickness of the wall of the heater, which will vary with variations in the thickness of the insulation 3. The bracket is interchangeable with other brackets having different dimensions A related to other wall or insulation thicknesses whereby to provide adjustment or variation for different thicknesses of insulation.

The main control body 8 has a gaseous fuel inlet 11 and a gaseous fuel outlet 12. Contiguous sections of a fuel supply pipe 13 are connected to the inlet 11 and outlet 12 of the valve body. The section connected to the outlet 12 leads to the main burner 14 for the water heater. The burner 14 is shown schematically and out of relation to the fire box of the heater for facility of disclosure.

A pilot burner 15 is located in juxtaposition to the main burner 14 to maintain a pilot flame for igniting the burner 14. The pilot burner 15 is supplied with gaseous fuel by a pilot supply pipe 16. The pilot fuel supply pipe 16 is connected, for example, to a pilot fuel outlet 17 disposed at the bottom of the control body 8 as shown in Figure 6. The positions of the pilot burner flames are shown in dotted lines for the purposes of illustration.

The fuel inlet 11 opens through a passage 18 to a valve opening 19 which opens into a chamber 20. The chamber 20 has a valve opening 21 which opens into a truncated conical bore 22 in which a truncated conical gas cock 23 is seated for turning movement. The cock or plug 23 has a passage 24 extending diametrically therethrough. An axial passage 25 leads from the passage 24 axially through the cock 23 to a passage 26 at the rear of the control body. The passage 26 leads downwardly to the pilot fuel outlet 17. A pilot burner adjusting screw 27 is adjustable in the end of the control body 8 to adjust the fuel supply for the pilot burner 15. A passage 28 opens laterally through the cock 23 from the diametrical passage 24, and, as will hereinafter appear, is adapted to register with the valve opening 21 for the supply of fuel for the pilot burner 15 when the gas cock 23 is turned to position shutting off the supply of fuel to the main burner 14 and with the passage 28 in register with the opening 21. The gas cock 23 may be adapted to be turned to position shutting off the supply of fuel from the opening 21 into the conical bore 22 thereby shutting off the fuel supply to both the main burner and the pilot burner.

A valve opening 29 opens from the bore 22 diametrically opposite the opening 21 into a chamber 30. The chamber 30 has a valve opening 31 which opens into the main fuel outlet 12 for delivery of gaseous fuel to the main burner 14. The passage 26 leading to the pilot fuel outlet 17 may be provided with a filter, shown diagrammatically at 32 in Figure 6, for the gaseous fuel for the pilot burner 16. The delivery of fuel from pipe 13 to the burner 14 may be through a mixing chamber 33 to which air is admitted through adjustable air inlets (not shown) for admixture with the gas, as well understood in the art.

A thermostat 40, in heat conducting relation to the water in the heater, constitutes the primary control of the device. This thermostat comprises a flexible bellows 36 filled with vapor or a volatile fluid which is adapted to expand and contract with accompanying expansion and contraction of the bellows upon changes in temperature of the water in the heater. Cooperating contacts 37 and 38 are disposed within the bellows 36 and within the vapor or fluid therein, and are arranged to be separated and engaged by expansion and contraction of the bellows. For this purpose the contact 38 may be fixed, and the contact 37 may be carried, for example, by the movable end of the bellows 36 for movement into and out of engagement with the contact 38. Bellows type thermostats of the type above described are more fully disclosed and claimed in the copending application of Philip R. Marvin, Serial No. 198,460, filed November 30, 1950.

The thermostat 40 controls the thermoelectric energization of the electromagnetic valve operator 35. The magnetic core, pole pieces, coil, and armature mounting of this valve operator is preferably of the type more fully disclosed and claimed in the copending application of Donley S. Collins, Gerald E. Dietz, and Adolph J. Hilgert, Serial No. 249,778, filed October 4, 1951.

Suffice it for purposes of the present application to state that the operator 35 has a core comprising a pair of small diameter posts 42 the ends of which are expanded in openings 43 in pole pieces 44, and thereafter heat-treated, which causes a deformation and joining of the grains of metal so that the posts 42 and pole pieces 44 are practically in one piece. Where the material used for the core of the operator will permit, the posts 42 and pole pieces 44 may be formed in one piece. The operator coil 45 is wound around the posts 42 and between the pole pieces 44, and comprises as an illustrative example approximately 72 turns of No. 15 gauge copper wire having a resistance substantially equal to the resistance of the thermocouple employed for powering the device, as will presently appear.

For purposes of exemplification, an electromagnetic valve operator of the type described is adapted, when energized by a single thermocouple heated by a gas burning pilot burner under fire box conditions, to actuate to open position a valve disc for controlling the flow of gaseous fuel to the main burner. The maximum that a single thermocouple is capable of producing under such conditions is approximately 1.26 amperes at approximately 35 millivolts or thermoelectric power of the order of approximately 44 milliwatts. Due to the limitation of this thermoelectric energy to a relatively minute amount, and the inability to electromagnetically operate the desired valve with such energy, it has heretofore been the practice to employ a thermopile, comprising a number of thermocouples joined in series, or other means for accomplishing the desired results.

The operator 35 is provided with an armature 48 at least equal in area to the pole faces of the adjacent pole pieces 44 through which the magnetic flux path is adapted to be completed. The armature 48 is held in place on a pivot bearing 49 by a spring 50 connected between the armature arm and, for example, the upstanding arm of an L-shaped supporting bracket 51 for the operator. The base of the core of the operator 35 is attached to the horizontal arm or base 52 of the bracket, for example, by screws, bolts, or the like (not shown).

The armature arm includes a leaf spring member 54 welded or otherwise attached to the armature 48 and constituting a spring extension of the armature. This spring extension 54 is connected at 55 to a valve disc 56 to open or separate the valve disc 56 from an annular valve seat 57 surrounding the adjacent end of the valve opening 31 when the operator is thermoelectrically energized and the armature 48 moves to attracted position. Upon deenergization of the operator 35, the armature moves to retracted position and the valve disc closes against its seat 57 under the action of the spring 50 and gas pressure which holds the valve disc 56 closed against the seat 57.

In order to provide for easy removal of the electromagnetic valve operator from its chamber or compartment 60 within the control body 8, it is fastened to a cover plate 61 along with a contact spring 62 which, when the operator is in place within the control body, engages the inner end of a gas-sealed terminal 63, thereby establishing one side of a thermoelectric circuit for the coil 45. The other side of the coil 45 is grounded, for example, by screws 64 which hold the plate 61 detachably to the front of the control body 8, as shown in Figure 1. The mounting of the valve operator on the cover plate 61 may be accomplished by fastening the bracket 51 to the cover plate 61 by welding, screws, rivets, bolts or the like.

Thermoelectric power for energizing the relay 35 and thermoelectric safety shutoff is supplied by a single thermocouple 68. In the illustrated embodiment of the invention, the thermocouple 68 is of the general character disclosed and claimed in Oscar J. Leins Patent No. 2,126,564, patented August 9, 1938, although it may be of any other suitable form. The thermocouple 68 has an outer tubular thermocouple member 69 formed of Chromel or other suitable material, and an inner thermocouple member 70 formed of copel or other suitable material separated in the thermoelectric series from the material from which the member 69 is formed. The thermocouple members 69 and 70 are joined at 71 to form a "hot" thermojunction which, in use, is positioned to be heated by the flame of the pilot burner 15.

Figure 2:
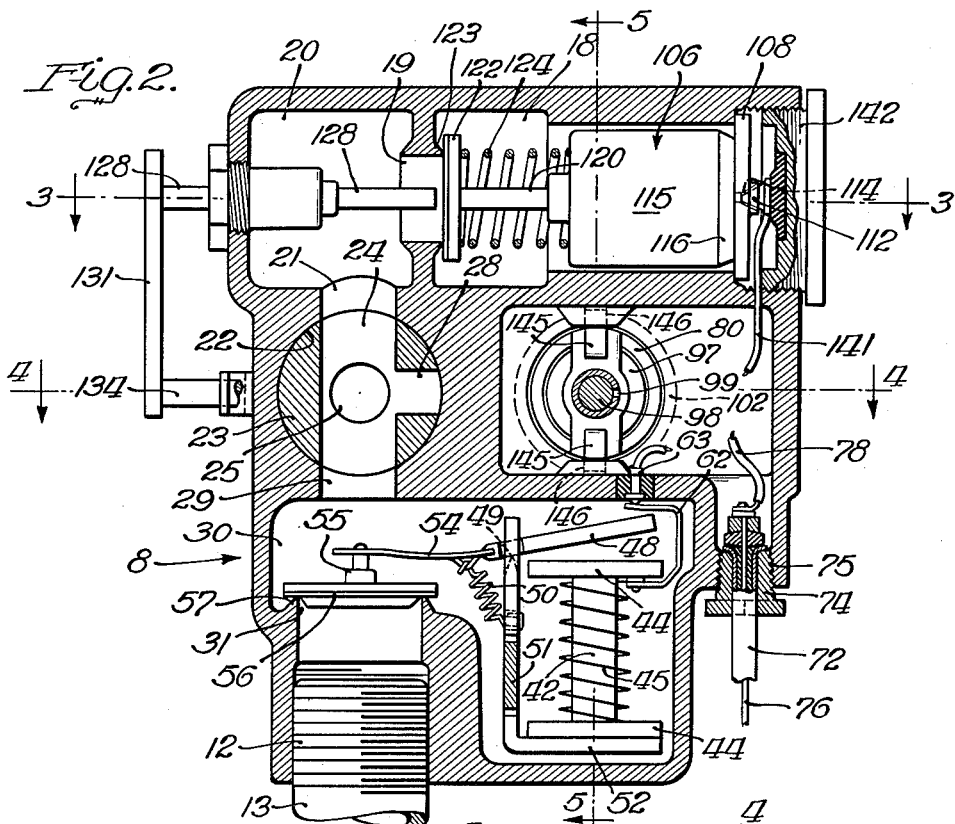
Figure 2 is a vertical sectional view taken substantially along the line 2—2 of Figure 1.

A tubular lead conductor 72 joined at 73 to the outer tubular thermocouple member has at its opposite end a couple lead attaching nut 74 which is screwed into the control body at 75, as shown in Figure 2. An inner lead conductor 76 is joined at 77 to the inner thermocouple member 70, and extends through the tubular conductor 72 and nut 74 and has an inwardly extending lead or terminal as shown at 78 in Figure 2.

The thermostat 40 is carried by a bracket 80, and the device may, if desired, be provided with a high limit switch 82 for opening or disabling the thermoelectric circuit upon the occurrence of a dangerous upper temperature limit within the heater, or when any other undesirable or dangerous or predetermined condition arises within the heater.

The high limit switch 82 may also be carried by the bracket 80, and is preferably positioned at the outer end of the thermostat 40. Thus when the control device is attached to the heater, the high limit switch 82 will be disposed between the thermostat 40 and the imperforate portion of the wall 1 and in contact or heat-conductive relation with respect to the wall 1. The limit switch thus constitutes a heat-conducting barrier between the wall 1 and the thermostat 40. Thus with a thermostat 40 having a high inherent sensitivity, such as is the case with thermostats of the vapor bellows type, the limit switch 82 will prevent too rapid burner cycling by the thermostat 40.

The high limit switch 82 comprises a metal shell 84 having an externally extending terminal 85 which enters the shell and is connected in circuit with a contact 86 carried by a spring arm 87 which biases it into engagement with a contact 88 which has a terminal extending externally of the shell 84. The spring arm 87 carries an axially disposed pin 89 which cooperates with a bimetal thermostat snap disc 90 within the shell 84. The contacts 86 and 88 are preferably gold-plated, or of other form, so as to be corrosion-resistant under the conditions of use to which the control device is put.

The full line position of the bimetal snap disc 90, as shown in Figure 5, is the position in which it is disposed with the contact 86 in contact with the contact 88 when the temperature of the water in the heater is below that considered unsafe for operation. When the hot water temperature exceeds that considered safe for operation (approximately 200° F.), the thermal sensitive disc 90 snaps to its dotted line position, thus separating the contact 86 from the contact 88 through actuation of the spring arm 87 by engagement of the disc 90 with the pin 89. This preferably opens only the thermoelectric circuit for the thermoelectric safety shut-off to be presently described, the high limit switch being preferably in series with the thermoelectric safety shutoff device only in the control of the present application.

The inwardly extending flexible lead 78 is connected in circuit with the contact 86, and also in circuit with one of the thermostat contacts 37, 38. The other of these latter contacts is connected by a flexible lead 92 to a gas sealed terminal 63 as shown more or less diagrammatically in Figure 4. When the electromagnetic valve operator 35 is installed in the control body 8, the contact spring 62 carried thereby contacts the inner end of the gas-sealed terminal 63. This completes the circuit from one side of the coil 45, for example, to the contact 37 of the thermostat.

The temperature adjustment (i. e., the temperature at which the contacts 37, 38 of the thermostat 40 separate) comprises a coiled spring 96, interposed between the movable end of the bellows 36 and an abutment plate 97, and a shaft 98 having splined connection at 99 with a stem extending inwardly from and rotatable with a temperature selecting or adjustment knob 100. The shaft 98 is screwed through and in threaded engagement with the part 101 of the bracket 80. Rotation of the temperature selecting or adjustment knob 100 imparts, by the threaded engagement of the shaft 98 with the bracket 80 and the splined connection at 99, a component of axial movement to the shaft 98. As a result, the inner end of the shaft 98, by its cooperation with the abutment plate 97, changes the force of the spring 96 acting in opposition to expansion of the bellows 36. The thermostat 40 may thus be set to separate the contacts 37, 38 at any desired temperature.

The thermostat 40, bracket 80, high temperature switch 82, shaft 98, and the stem of the knob 100, as well as the splined connection, are readily removable as a unit from the control body 8 by merely removing the knob 100 from the outer end of its stem and removing the unit endwise from the rear of the adapter brackets 4, assuming, of course, that the bracket is not attached to the wall 1.

Figure 3:
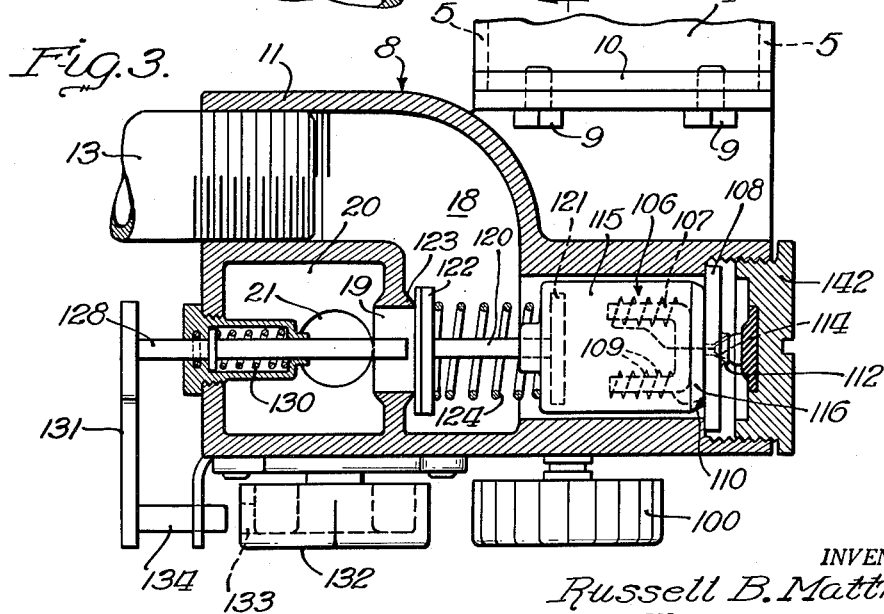
Figure 3 is a horizontal sectional view taken substantially along the line 3—3 of Figure 2.

To provide for automatic adjustment of the high limit switch 82 into intimate contact with the wall 1, notwithstanding variations in the insulation thickness of the wall of the heater and in the corresponding length or dimension A of the adapter brackets 4, a coiled spring 102 surrounds the adjacent portion of the bracket 80 and is interposed endwise between an annular flange 103 at the inner end of the bracket 80 and a shoulder 104 on the control body 8. The splined connection 99, between the shaft 98 and the stem of the knob 100, allows for movement of the high limit switch-thermostat combination which occurs during this automatic adjustment. The spring 102 presses the high limit switch 82 yieldingly into intimate contact with the wall 1 not withstanding the above-mentioned variations in wall thickness and bracket lengths.

Where 100% fuel shut-off is desired, a thermoelectric safety shut-off device is provided as indicated, in general, at 106 in Figures 2 and 3. This device may, for example, be in the form disclosed in the copending application of Earl A. Fritz, Serial No. 186,390, filed September 23, 1950.

Suffice it for purposes of the present application to state that the device 106 comprises a generally U-shaped magnet frame 107 carried by a terminal bushing 108. A coil 109, wound around the legs of the magnet frame 107, is grounded at one end to the terminal bushing 108 at 110. The opposite end of the coil 109 is connected in circuit with an externally exposed terminal tip 112 mounted in an opening in the bushing 108 and insulated from the bushing by insulation 114. A magnet hood 115 is applied over the magnet frame 107 and coil 109, and is spun at 116 into engagement with the terminal bushing 108.

A stem 120 is mounted for reciprocatory movement through an opening in the inner end of the hood 115. An armature 121 is mounted for relative movement on the inner end of the stem 120 to permit self-accommodation to the pole faces of the magnet frame 107. A valve disc 122 is mounted for relative movement on the outer end of the stem 120 for self-accommodation to an annular valve seat 123 surrounding the adjacent end of the valve opening 19. A coiled spring 124 is interposed between the valve disc 122 and the hood 115, and moves the valve disc 122 to closed position against the valve seat 123 when the electromagnet, comprising the magnet frame 107 and the coil 109, is deenergized.

If the energization of the latter electromagnet, while sufficient to hold the armature 121 in attracted position and the valve disc 122 in open position, is insufficient to move the armature to attracted position and the valve disc to open position, a manual reset stem 128 may be provided. This stem has reciprocatory movement in the control body 8, and when pressed inwardly, engages the valve disc 122 and forces same manually to open position and the armature to attracted position. When the armature 121 is held attracted by the energization of the electromagnet which includes the coil 109 by the heat of the pilot burner flame on the thermocouple 68, the reset stem may be released and is moved outwardly to retracted position by a spring 130.

The reset stem 128 projects outwardly from the control body 8, and has a cocking or resetting button or finger piece 131. The outwardly projecting stem of the gas cock 23 has a handle 132 for turning the same. If desired, this handle may have a hole 133 which, as shown in dotted lines in Figures 3 and 4, is positioned to register with a pin 134 on the button 131 only when the gas cock is in closed position shutting off the supply of fuel to the main burner. If the gas cock 23 is open, the pin 134 will abut the rim of the handle 132 and prevent resetting of the valve 122 to open position. However, when the gas cock 23 is closed, the valve 122 may be reset to open position because the pin 134 will then move into the hole 133. The gas cock 23 may, of course, as previously mentioned, be rotatable to a position for shutting off the fuel supply for both the main burner and the pilot burner.

As shown more or less diagrammatically in Figure 4, a flexible lead conductor 140 leads from the contact 88 of the high limit switch to a gas-sealed terminal 141. This terminal presses yieldingly into contact with terminal tip 112 at the adjacent end of the hood 115. A cap 142, screwed into the control body 8, has its inner end insulated and, when in place, presses the terminal 141 into good electrical contact with the terminal tip 112. The hood 115, with its magnet frame, coil, stem, armature, and valve disc 122, is readily removable as a unit by merely unscrewing the cap 142 and removing the unit through the opening. The yielding terminal 141 is adapted to be swung downwardly out of the way to permit such removal.

A proposed modification of the present embodiment of the invention is to separate the thermostat and high limit combination from the main valve structure with a pair of electrical conductors connecting the two units. This would place the temperature control knob on the side of the tank and the control valve could be buried in the heater compartment.

In devices not requiring 100% shut-off, the thermoelectric safety shut-off may be omitted, and there is then provided an inexpensive thermoelectrically powered control device that will turn on the main burner only when the pilot burner is ignited.

In the automatic adjustment of the high limit switch 82 into contact with the wall 1 as previously described, the bracket 80 is guided by laterally projecting guide fingers 145 on the bracket 80. These fingers 145 have sliding movement in guide grooves 146 in the control body 8.

A further adjustment for the fuel supply may be provided by an adjusting screw 148 having screwed engagement with the gas cock 23 as shown in Figure 4. The inner end of the stem of this screw may be tapered as shown at 149. By screwing the screw 148 inwardly or outwardly, the tapered end 149 decreases or increases the obstruction to the flow of gas through the gas cock 23.

The operation of the device is as follows:

The handle 132 is turned to rotate the gas cock 23 to pilot position as indicated in Figure 1. In this position the cock 23 shuts off the flow of gas to the main burner 14 and passage 28 is in register with the port 21 for the flow of gas for the pilot burner 15 when the safety shut-off valve disc 122 is opened and held open.

The hole 133 is then in register with the pin 134, thus permitting cocking the valve disc 122 to open position and armature 121 to attracted position by depressing the button 131. Gas entering at 11 then flows through port 19, through gas cock port 28, through passage 25 to the rear of the control device (gas flow shown by the dot-and-dash line 152 in Figure 6), through pilot fuel filter 32, through pilot fuel adjustment valve 27, and through outlet 17 and pipe 16 to the pilot burner. Ignition of the pilot burner 15 heats the thermocouple 68 which energizes the electromagnet comprising magnet frame 107 and coil 109. This electromagnet then retains the valve disc 122 open, and the button 131 may be released and moves to its retracted position.

The heating of the thermocouple 68 also supplies energy to thermoelectrically actuate the valve disc 56 to open position when the thermostat contacts 37 and 38 and the high limit switch contacts 86 and 88 are closed. In addition to gas pressure, a sealing force of 15 grams is applied to hold the valve disc 56 on its seat 57. As well known in the art, the pull of the armature 48 increases exponentially as it approaches the pole faces of the pole pieces 44 when the relay 35 is energized. This pull in force is stored in the flexible spring 54 until the pull of the armature 48 exceeds that of the gas pressure plus the 15 grams sealing force, and the valve disc 56 then snaps to open position. The spring member 54 therefore allows greater movement of the armature 48 with resulting increase in valve opening and resulting greater capacity.

The gas cock 23 may then be turned to "On" position for the flow of gas to the main burner 14 which is ignited by the pilot burner. The knob 100 is turned to any desired temperature setting as indicated by the temperature markings thereon (Figure 1). When the temperature, for example, of the water in the water heater exceeds the temperature for which the device is set, the thermostat contacts 37, 38 separate and open the circuit for the operator 35. The accompanying deenergization of the operator permits the spring 50 to actuate the armature 48 to retracted position and the valve disc 56 to closed position, thus shutting off the supply of gas to the main burner 14.

When the temperature drops and the thermostat contacts 37, 38 close, indicating the need for heat, the operator 35 is again thermoelectrically energized and operates the valve disc 56 to open position. Gas supply is thus established to the main burner 14 which is reignited by the pilot burner.

If at any time the temperature of the water exceeds that considered safe for operation, the contacts 86, 88 of the high limit switch 82 separate. This opens the circuit for the thermoelectric safety shutoff device, and its valve disc then closes to shut off the supply of gas to the main burner and to the pilot burner.

If at any time the flame of the pilot burner 15, which normally should burn constantly, becomes extinguished, thereby creating an unsafe condition, the thermocouple 68 will be deenergized and the flow of energizing thermoelectric current in the coil winding 109 will be discontinued. When this occurs, the spring 124 will instantly close the valve disc 122 against its seat 123. This provides 100% safety shut-off by shutting off the supply of gas both for the main burner 14 and the pilot burner 15.

When it is desired again to reset the burner and/or pilot burner in operation, the device is reset by depressing the button 131 and operating the device as previously described.

An electrical interlock for flow interruption is contemplated by providing a pair of normally closed contacts (not shown) in series with the automatic valve operator and causing them to open when the cocking button 131 is depressed. This will assure that the valve disc 56 is closed during cocking of the thermoelectric safety shut-off mechanism, with resulting safe lighting.

The device of the present application in a modified form is contemplated for use on space heater applications. Such a space heater control will preferably consist of only the automatic valve operator, gas cock and thermostat. The thermostat, which consists of a temperature sensitive vapor-filled bulb, may be positioned at a remote location and connected to a bellows located at the control. This arrangement will allow the temperature control adjustment to be located at the valve; also the distance between the valve and the temperature sensitive bulb can vary as desired, and will be independent of the electrical circuit which is limited to short leads because of the low voltage developed by the single thermocouple.

A further embodiment of features of the present invention will divorce the temperature adjustment from the valve so that it may, for example, be mounted on the front of a space heater, thereby eliminating the need to reach behind it in order to adjust the temperature. A short length of thermocouple lead will provide the necessary electrical connection between the valve and the thermostat. The temperature sensitive vapor-filled bulb in such case may be connected to the temperature adjustment control, providing great flexibility.

The embodiment of the invention shown in Figures 7 and 8 is the same as the embodiment previously described, except that instead of having the hole 133 and pin 134 for preventing the resetting operation except when the gas cock 23 is closed, the device is provided with a flow interrupter of the type disclosed and claimed in Charles V. Hildebrecht Patent No. 2,114,446, patented April 19, 1938.

In Figures 7 and 8, parts which are like parts of the device previously described are designated by primed reference characters corresponding with the reference characters used in connection with Figures 1 to 6, inclusive.

In Figures 7 and 8 the reset stem 128' has, at its outer end, a reset button 131' which, when depressed, actuates the armature 121' to attracted position and the valve disc 122' to open position. The stem 128' has a flow interrupter valve disc 160 which, when the stem is depressed, is seated, for example, by a spring 161 against an annular valve seat 162 to shut off all flow of gas until the valve disc 122' is held open and the reset stem 128' has returned to its retracted position. The return of the stem 128' to its retracted position with accompanying movement of flow interrupter valve disc 160 to open position is accomplished by the spring 130'.

A pilot fuel outlet 180 is shown in Figures 7 and 8 as leading from position between the valve seats 123' and 162.

The use of other forms of flow interrupters is contemplated within the scope of the present invention. The illustrated arrangement for accomplishing safe lighting are exemplary but sufficient for purposes of the present application, which will not, therefore, be burdened with showings of other arrangements for accomplishing safe lighting.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

I claim:

1. Condition responsive apparatus for controlling flow of fuel comprising, in combination, a control body for attachment to a heater and having a fuel inlet and a fuel outlet, a valve for controlling the flow of fuel, an electromagnetic operator for actuating said valve, a thermoelectric generator affording a source of electric energy for energizing said operator and actuating said valve, said electromagnetic operator comprising an electromagnet in circuit with said thermoelectric generator and an armature adapted to be attracted to said electromagnet when the latter is energized, connections between said armature and said valve comprising a spring arm which stores up energy imparted by attraction of said armature until the stored energy is sufficient to overcome the sealing force of the valve, and condition responsive means comprising an enclosure expansible and contractible with changes in a condition and contacts encapsulated within said enclosure for relative movement with expansion and contraction of said enclosure, said contacts being in circuit with said thermoelectric generator for controlling the supply of electric energy to said operator thereby controlling actuation of said valve in response to changes in the condition, said condition responsive means being carried by said control body to be held in heat conductive relation to an outer surface of an imperforate wall portion of the heater by attachment of said control body to said heater.

2. Condition responsive apparatus according to claim 1 wherein there is safety shut-off means comprising a second valve for controlling the flow of fuel and further comprising an armature operatively connected to said second valve and an electromagnet also energized by said thermoelectric generator and adapted when so energized to maintain said armature in attracted position and said second valve open as long as said thermoelectric generator is heated, and a second condition responsive means calibrated to respond to an extreme condition and connected in said thermoelectric circuit to interrupt the flow of electricity therethrough and close said valves upon occurrence of an extreme condition.

3. Condition responsive apparatus according to claim 1 wherein there is safety shut-off means comprising a second valve for controlling the flow of fuel and further comprising an armature operatively connected to said second valve and an electromagnet also energized by said thermoelectric generator and adapted when so energized to maintain said armature in attracted position and said second valve open as long as said thermoelectric generator is heated, and a second condition responsive means calibrated to respond to an extreme condition and connected in said thermoelectric circuit to interrupt the flow of electricity therethrough and close said valves upon occurrence of an extreme condition, said second condition responsive means being disposed at the outer end of said first condition responsive means for interposition between said first condition responsive means and the imperforate wall portion of the heater when said control body is attached to the heater.

4. Condition responsive means according to claim 1 wherein there is an adapter bracket enclosing said condition responsive means and of a length to extend between the inner and outer wall parts of the wall of the heater, said bracket being formed for attachment at one end to the inner wall portion of the heater and at its other end for attachment of said control body thereto externally of said outer wall part.

5. Condition responsive means according to claim 1 wherein there is safety shut-off means comprising a second valve for controlling the flow of fuel and further comprising an armature operatively connected to said second valve and an electromagnet also energized by said thermoelectric generator and adapted when so energized to maintain said armature in attracted position and said second valve open as long as said thermoelectric generator is heated, a second condition responsive means calibrated to respond to an extreme condition and connected in said thermoelectric circuit to interrupt the flow of electricity therethrough and close said valves upon occurrence of an extreme condition, said second condition responsive means being disposed at the outer end of said first condition responsive means for interposition between said first condition responsive means and the imperforate wall portion of the heater when said control body is attached to the heater, and an adapter bracket enclosing said first and second condition responsive means and of a length to extend between inner and outer wall parts of the wall of the heater, said bracket being formed for attachment at one end to the inner wall part of the wall of the heater and at its outer end for attachment of said control body thereto externally of said outer wall part.

6. Temperature responsive control apparatus for fluid fuel burners, comprising: A cycling type electromagnetically operated fuel control valve; an electromagnetically operated safety shut-off fuel control valve; a thermoelectric generator connected in circuit with said cycling and said safety shut-off valves and adapted when heated by burning of the fuel to afford a source of electric energy for powering said valves; a first temperature responsive circuit controlling means connected in said thermoelectric circuit to control the flow of thermoelectric current to said cycling valve, said means including a first pair of relatively movable contacts encapsulated within a thermally expansible and contractible enclosure, said means being calibrated for response to normal temperature fluctuations to cycle said cycling valve in response to said normal fluctuations; a second temperature responsive circuit controlling means connected in said thermoelectric circuit to control the flow of thermoelectric current to said safety shut-off valve independently of the current flow to said cycling valve, said second means including a second pair of relatively movable contacts and temperature responsive means for actuating said second contacts, said second means being calibrated for response to excessive temperatures to interrupt the flow of thermoelectric current to said safety shut-off valve and cause closure of the latter, thereby shutting off all fuel flow to the burner; and common heat conducting means connected to said enclosure and actuating means and adapted to be subjected to a source of heat, said heat conducting means being operable to receive heat from said source and to transmit said heat to said enclosure and actuating means for response thereto.

7. Apparatus for controlling fluid flow comprising, in combination, an electric circuit including a thermoelectric generator as a source of electric energy and an electrically operated valve actuated solely by said source of energy comprising an electromagnet adapted to be energized from said source, an armature which is attracted to said electromagnet when so energized, the attractive force of said electromagnet on said armature increasing exponentially with movement of the latter toward the former, a valve member, an energy storing force transmitting connection between said armature and valve member including a flexible energy storing arm, and means biasing said armature to retracted position and said valve member to closed position to thereby afford said valve member substantial sealing force independently of the fluid controlled thereby, initial movement of said armature toward attracted position in response to the initial attractive force of said electromagnet effecting storage of energy in said arm until such stored energy together with the increased attractive force of said electromagnet due to the approach of said armature to attracted position is sufficient to overcome the forces on said valve member resisting opening movement thereof, whereupon said valve member is actuated to open position.

8. Apparatus for controlling fluid flow comprising, in combination, an electric circuit including a single thermocouple as a source of electric energy and an electrically operated valve actuated solely by said source of energy comprising an electromagnet adapted to be energized from said source, an armature which is attracted to said electromagnet when so energized, the attractive force of said electromagnet on said armature increasing exponentially with movement of the latter toward the former, a valve member, an energy storing force transmitting connection between said armature and valve member including a flexible energy storing arm, and means biasing said armature to retracted position and said valve member to closed position to thereby afford said valve member substantial sealing force independently of the fluid controlled thereby, initial movement of said armature toward attracted position in response to the initial attractive force of said electromagnet effecting storage of energy in said arm until such stored energy together with the increased attractive force of said electromagnet due to the approach of said armature to attracted position is sufficient to overcome the forces on said valve member resisting opening movement thereof, whereupon said valve member is actuated to open position.

9. An electromagnetically operated valve adapted to be actuated solely from a source of energy of low power comprising, in combination, an electromagnet having alined pole faces, a pivotally mounted armature movable between attracted and retracted positions with respect to said pole faces about an axis offset laterally from and parallel to the alinement of said pole faces, whereby the spatial relation between said armature and one of said pole faces is substantially the same as that between said armature and the other of said pole faces in all positions of said armature, a valve member, means biasing said valve member to closed position to afford the latter substantial sealing force independently of the pressure of the fluid controlled thereby, and a force transmitting connection between said armature and valve member for effecting opening movement of said valve member in response to movement of said armature toward said pole faces, said connection including a flexible energy storing arm in which energy is stored during initial attractive movement of said armature until such stored energy together with the increased attractive force of said electromagnet due to the approach of the armature to attracted position is sufficient to overcome the forces resisting opening movement of the valve member.

10. An electromagnetically operated valve adapted to be actuated solely from a source of energy of low power comprising, in combination, an electromagnet having a plurality of poles, an energizing winding for said electromagnet distributed among said poles to decrease the mean length of turn of said winding and hence the resistance thereof per turn and to afford said winding an increased number of ampere-turns for a given length of winding, a pivoted armature movable between attracted and retracted positions with respect to said electromagnet, a valve member, means biasing said valve member to closed position to afford said valve member substantial sealing force independently of the fluid controlled by said valve member, and a force transmitting connection between said armature and said valve member to effect opening movement of said valve member in response to attractive movement of said armature, said connection including a flexible energy storing arm in which energy is stored during initial attractive movement of said armature and until such stored energy together with the increased attractive force of said electromagnet due to the approach of said armature to attracted position is sufficient to overcome the forces resisting opening movement of the valve member.

11. Condition responsive control apparatus for fluid fuel burners, comprising: A main fuel control valve; an electromagnetic operator for said fuel control valve operable electrically and directly to cycle said valve; an electromagnetically operated safety shut-off fuel control valve; a single thermocouple connected in circuit with said operator and said safety shut-off valve and adapted when heated by burning of the fuel to afford a source of electric energy for powering said operator and said safety shut-off valve; a first condition responsive circuit controlling means connected in said thermoelectric circuit to control the flow of thermoelectric current to said operator, said means including a first pair of relatively movable contacts encapsulated within an enclosure, said means being calibrated for response to normal fluctuations in the condition to cycle said cycling valve in response to said normal fluctuations; and a second condition responsive circuit controlling means connected in said thermoelectric circuit to control the flow of thermoelectric current to said safety shut-off valve independently of the current flow to said cycling valve, said second means including a second pair of relatively movable contacts encapsulated within an enclosure, said second means being calibrated for response to an extreme condition to interrupt the flow of thermoelectric current to said safety shut-off valve and cause closure of the latter.

12. Temperature responsive control apparatus for fluid fuel burners, comprising: A main fuel valve; an electromagnetic operator for said fuel control valve operable electrically and directly to cycle said valve; an electromagnetically operated safety shut-off fuel control valve; a thermoelectric generator connected in circuit with said cycling operator and said safety shut-off valve and adapted when heated by burning of the fuel to afford a source of electric energy for powering said operator and said safety shut-off valve; a first temperature responsive circuit controlling means connected in said thermoelectric circuit to control the flow of thermoelectric current to said operator, said means including a first pair of relatively movable contacts encapsulated within an enclosure, said means being calibrated for response to normal fluctuations in temperature to cycle said cycling valve in response to said normal fluctuations; a second temperature responsive circuit controlling means connected in said thermoelectric circuit to control the flow of thermoelectric current to said safety shut-off valve independently of the current flow to said cycling valve, said second means including a second pair of relatively movable contacts encapsulated within an enclosure, said second means being calibrated for response to excessive temperatures to interrupt the flow of thermoelectric current to said safety shut-off valve and cause closure of the latter, and means for mounting said first and second circuit controlling means as a unit for exposure to the temperature to which said apparatus is responsive.

13. A cycling type electromagnetically operated control device; an electromagnetically operated safety shut-off control device; a thermoelectric generator in circuit with both of said control devices and adapted to afford a source of electric energy for powering said device; a first condition responsive circuit controlling means connected in said thermoelectric circuit to control the flow of thermoelectric current to said cycling control device, said means including a first pair of relatively movable contacts and condition responsive contact actuating means, said first circuit controlling means being calibrated for response to normal fluctuations in the condition to cycle said cycling control device in response to said normal fluctuations; a second condition responsive circuit controlling means connected in said thermoelectric circuit to control the flow of thermoelectric current to said safety shut-off control device independently of the current flow to said cycling control device, said second circuit controlling means including a second pair of relatively movable contacts and condition responsive second contact actuating means; said second circuit controlling means being calibrated for response to an extreme condition to interrupt the current flow to said safety shut-off device and effect actuation thereof; and common condition sensing means for both of said contact actuating means.

14. Condition controlling apparatus comprising: A cycling type electromagnetically operated control device; an electromagnetically operated safety shut-off control device; a thermoelectric generator in circuit with both of said control devices and adapted to afford a source of electric energy for powering said device; a first condition responsive circuit controlling means connected in said thermoelectric circuit to control the flow of thermoelectric current to said cycling control device, said means including a first pair of relatively movable low resistance contacts encapsulated within a first enclosure and condition responsive contact actuating means, said first circuit controlling means being calibrated for response to normal fluctuations in the condition to cycle said cycling control device in response to said normal fluctuations; a second condition responsive circuit controlling means connected in said thermoelectric circuit to control the flow of thermoelectric current to said safety shut-off control device independently of the current flow to said cycling control device, said second circuit controlling means including a second pair of relatively movable low resistance contacts encapsulated within a second enclosure and condition responsive second contact actuating means, said second circuit controlling means being calibrated for response to an extreme condition to interrupt the current flow to said safety shut-off device and effect actuation thereof; and common condition sensing means for both of said contact actuating means.

15. Temperature responsive control apparatus comprising, in combination, a control body for attachment to a heated receptacle or the like, a first control member movable between controlling positions, a first electromagnetic operator for cycling said first control member, a thermoelectric generator for energizing said first operator and actuating said first control member, a first thermostat comprising relatively movable contacts and temperature responsive contact actuating means, said contacts being in circuit with said generator and operator for controlling the supply of electric energy to said operator and thereby effecting the cycling of said first control member in response to normal fluctuations in temperature, a second control member movable between controlling positions, a second electromagnetic operator for holding said second control member in one controlling position when energized, and a second thermostat comprising relatively movable contacts and temperature responsive contact actuating means, said last-mentioned contacts being in circuit with said generator and said second operator for controlling the supply of electric energy to said second operator, said second thermostat being responsive to extreme temperatures to deenergize said second operator and thereby effect release of said second control member for movement to another controlling position, both of said thermostats being carried by said control body to be held in heat conductive relation to a wall portion of said receptacle by attachment of said control body to said receptacle.

References Cited in the file of this patent

UNITED STATES PATENTS

| 360,823 | Singer | Apr. 5, 1887 |
| 582,267 | Conellopoulos | May 11, 1897 |
| 804,943 | Fulton | Nov. 21, 1905 |
| 1,508,511 | Erickson | Sept. 16, 1924 |
| 1,509,928 | Breeds | Sept. 30, 1924 |

(Other references on following page)

UNITED STATES PATENTS

| | | |
|---|---|---|
| 1,665,719 | Schnepp | Apr. 10, 1928 |
| 1,724,804 | Root | Aug. 13, 1929 |
| 1,835,974 | Shivers | Dec. 8, 1931 |
| 2,019,991 | Nilson | Nov. 5, 1935 |
| 2,112,750 | Price | Mar. 29, 1938 |
| 2,125,627 | Fonseca | Aug. 2, 1938 |
| 2,312,479 | Ray | Mar. 2, 1943 |
| 2,372,307 | Alexander | Mar. 27, 1945 |
| 2,375,569 | McCarty | May 8, 1945 |
| 2,456,907 | Berberich | Dec. 21, 1948 |
| 2,591,897 | Weber | Apr. 8, 1952 |

OTHER REFERENCES

Catalog 51 (pages 1, 11, 17 and Front cover) of General Controls Company. Copyrighted 1941.